(12) United States Patent
Grass et al.

(10) Patent No.: US 8,956,043 B2
(45) Date of Patent: Feb. 17, 2015

(54) TANK DEVICE FOR STORING A LIQUID MEDIUM THAT REDUCES POLLUTANT LEVELS

(75) Inventors: Philippe Grass, Regensburg (DE); Stephan Heinrich, Pfeffenhausen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/398,696

(22) Filed: Feb. 16, 2012

(65) Prior Publication Data

US 2012/0285857 A1 Nov. 15, 2012

(30) Foreign Application Priority Data

Feb. 17, 2011 (DE) .......................... 10 2011 011 631

(51) Int. Cl.
| | | |
|---|---|---|
| *E21B 47/06* | (2012.01) | |
| *H01B 17/26* | (2006.01) | |
| *B60K 15/03* | (2006.01) | |
| *B60K 13/04* | (2006.01) | |

(52) U.S. Cl.
CPC .......... *B60K 15/03177* (2013.01); *B60K 13/04* (2013.01); *B60K 2015/0321* (2013.01); *B60K 2015/03032* (2013.01)
USPC ...................................................... 374/210

(58) Field of Classification Search
CPC ......... F01N 3/10; F01N 11/00; F01N 13/002; F01N 13/008; F01N 13/04; F01N 13/102; F01N 13/18; F01N 13/1805; F01N 3/0222; F01N 3/2013; F01N 3/206; F01N 3/208; F01N 3/2828; F01N 3/2892

USPC ........................................................... 174/151
See application file for complete search history.

(56) References Cited

U.S. PATENT DOCUMENTS

| | | | | |
|---|---|---|---|---|
| 4,343,187 | A | * | 8/1982 | Kaji .................................. 73/654 |
| 4,420,738 | A | * | 12/1983 | Rehmann et al. ................ 338/28 |
| 4,942,764 | A | * | 7/1990 | Dews et al. ....................... 73/301 |
| 5,170,017 | A | * | 12/1992 | Stanevich et al. .......... 174/153 G |
| 5,689,059 | A | * | 11/1997 | Oh et al. ........................ 73/23.31 |
| 5,820,739 | A | * | 10/1998 | Graser et al. ................... 204/421 |
| 6,293,770 | B1 | * | 9/2001 | Matsumoto et al. .......... 417/361 |
| 6,357,618 | B1 | * | 3/2002 | Kloess et al. .................. 220/562 |
| 6,555,754 | B2 | * | 4/2003 | Gilmour ........................ 174/151 |
| 6,594,987 | B2 | * | 7/2003 | Uranishi .......................... 60/277 |
| 6,661,339 | B2 | * | 12/2003 | Muirhead ...................... 340/505 |
| 6,669,043 | B2 | * | 12/2003 | Fish et al. ...................... 220/4.14 |
| 6,719,163 | B1 | * | 4/2004 | Delbarre et al. .............. 220/562 |
| 7,168,423 | B2 | * | 1/2007 | Nonaka .......................... 123/703 |

(Continued)

FOREIGN PATENT DOCUMENTS

| | | |
|---|---|---|
| DE | 30 18 242 A1 | 11/1981 |
| DE | 196 02 819 A1 | 7/1997 |

(Continued)

*Primary Examiner* — Lisa Caputo
*Assistant Examiner* — Nasir U Ahmed
(74) *Attorney, Agent, or Firm* — Cozen O'Connor

(57) ABSTRACT

A tank device for storing a liquid medium for reducing pollutant levels in exhaust gases includes a container for storing the liquid medium, having a container wall, which is a first plastic at least in a first contact area. The tank device furthermore includes a support element, which is arranged in an aperture in the container wall and has an overmolding which is a second plastic at least in a second contact area. The second contact area is coupled to the first contact area of the container wall in a substantially liquid-tight manner.

10 Claims, 2 Drawing Sheets

(56) References Cited

U.S. PATENT DOCUMENTS

| | | | |
|---|---|---|---|
| 2001/0035826 A1* | 11/2001 | Lang et al. | 340/587 |
| 2002/0020705 A1* | 2/2002 | Vorenkamp et al. | 220/4.14 |
| 2002/0113694 A1 | 8/2002 | Muirhead | |
| 2004/0006164 A1* | 1/2004 | Abu-Isa | 524/283 |
| 2006/0281372 A1* | 12/2006 | Mott et al. | 439/736 |
| 2009/0188923 A1* | 7/2009 | Versaw et al. | 220/564 |
| 2009/0301190 A1* | 12/2009 | Ross et al. | 73/304 C |
| 2011/0036079 A1* | 2/2011 | Capelle et al. | 60/298 |

FOREIGN PATENT DOCUMENTS

| | | |
|---|---|---|
| DE | 197 55 297 A1 | 6/1999 |
| DE | 199 46 530 | 3/2001 |
| EP | 10 2007 059 848 A1 | 6/2009 |

* cited by examiner

TANK DEVICE FOR STORING A LIQUID MEDIUM THAT REDUCES POLLUTANT LEVELS

BACKGROUND OF THE INVENTION

1. Field of the Invention

The invention relates to a tank device for storing a liquid medium for reducing pollutant levels in exhaust gases.

2. Description of the Related Art

To reduce the proportion of nitrogen oxide in the exhaust gas of an internal combustion engine, exhaust gas aftertreatment can be carried out with an aqueous reducing agent solution and an SCR catalytic converter. The aqueous reducing agent solution can also be referred to as a reducing agent. The reducing agent is preferably urea. For aftertreatment of the exhaust gas, the aqueous reducing agent solution is pumped by a liquid pump to a reducing agent injection valve that meters the reducing agent solution into an exhaust gas stream in an exhaust section of the internal combustion engine upstream of the SCR catalytic converter. For storing the reducing agent, use is made predominantly of specially designed tanks that can have one or more sensor elements.

SUMMARY OF THE INVENTION

An object of one embodiment of the invention is to provide a tank device for storing a liquid medium that reduces pollutant levels, which device allows reliable storage of the liquid medium that reduces pollutant levels. At the same time, it should be possible to produce the tank device economically.

According to one embodiment of the invention, a tank device for storing a liquid medium for reducing pollutant levels in exhaust gases is provided. The tank device comprises a container for storing the liquid medium has a container wall, which comprises a first plastic at least in a first contact area. The tank device furthermore comprises a support element arranged in an aperture in the container wall and has an overmolding comprising a second plastic at least in a second contact area, which is coupled to the first contact area of the container wall in a substantially liquid-tight manner in the second contact area.

The tank device according to one embodiment of the invention can, for example, be produced by an injection molding process in which the support element is arranged as a pre-molding in the container wall. The container can be composed substantially of the first plastic. One advantageous possibility is to arrange the support element in a desired region of the container, e.g. in a region covered by the liquid medium in the majority of cases. It is possible to arrange and/or at least partially pass the support element and/or connections out of the container independently of an inlet opening and/or of an air volume above a maximum liquid level. The support element, which can have at least one sensor element and/or a further electrical component, can be arranged in the aperture of the container wall such that the at least one sensor element and/or the component is/are arranged only partially within the container. This can contribute to increasing the reliability of the sensor element and/or of the component since the liquid medium may freeze at winter temperatures, e.g. below −10° C.

The support element can be coupled, in particular joined, to the first contact area of the container wall in a liquid-tight manner in the second contact area. One preferred possibility is for the liquid medium to comprise a reducing agent, e.g. an aqueous urea solution. The reducing agent may have highly corrosive and/or chemically aggressive properties. A plastic joint between the first contact area and the second contact area can allow long-lived, reliable, liquid-tight coupling between the support element and the container wall. The coupling can be produced by a welded joint and/or an adhesive joint. This allows economical production and a compact construction. Fastening the support element does not require any further fastening elements that penetrate the container wall and have a disadvantageous effect on the leaktightness of the coupling between the support element and the container wall owing to tolerances, e.g. a screw diameter tolerance. Moreover, the leaktightness of the coupling between the container wall and the support element cannot be negatively affected by the corrosive properties of the liquid medium. The first and the second plastic can be chosen so that the plastics have a similar temperature coefficient or a substantially identical temperature coefficient, thus ensuring that almost no thermal stresses occur in the coupling region.

In one embodiment, the first plastic and the second plastic comprise polyethylene or are composed of polyethylene. Polyethylene can advantageously have sufficient chemical resistance to the liquid medium.

In one embodiment, the support element comprises a sensor device.

In one embodiment, the sensor device comprises a temperature sensor element. This advantageously enables the temperature of the liquid medium in the container to be detected.

In one embodiment, the temperature sensor element has an electrical resistor with a negative temperature coefficient.

In one embodiment, the temperature sensor element is arranged at an end of the support element that points into the container.

In one embodiment, the aperture is arranged in spatial proximity to a discharge opening of the tank device. The discharge opening is preferably arranged in the tank device such that the tank can be almost completely emptied. Arranging the support element in spatial proximity to the discharge opening can therefore advantageously allow detection of the temperature and/or of some other measured variable of the liquid medium, even if the liquid level in the container is low. In particular, the aperture can be arranged in a bottom wall of the container.

In one embodiment, the support element comprises a locking device for the mechanical and/or electrical coupling of at least one further subassembly. This enables the subassembly to be replaced or added or removed when required.

In one embodiment, the support element has electrical connections at a second end pointing outward, out of the container. The connections are coupled electrically in a predetermined manner to the sensor device and/or the locking device. This enables contact to be made with the sensor element and/or the at least one further subassembly from outside the container. The electrical connections can be designed as plug connectors.

In one embodiment, the subassembly comprises an ultrasonic sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained below with reference to the schematic drawings, in which.

Elements of identical construction or function are provided with the same reference signs throughout the figures.

DETAILED DESCRIPTION OF THE PRESENTLY PREFERRED EMBODIMENTS

The tank device 110 for storing a liquid medium for reducing pollutant levels in exhaust gases can be arranged in a motor vehicle. The liquid medium for reducing pollutant levels can preferably comprise a reducing agent and/or a reducing agent precursor, e.g. an aqueous urea solution.

Figure 1:
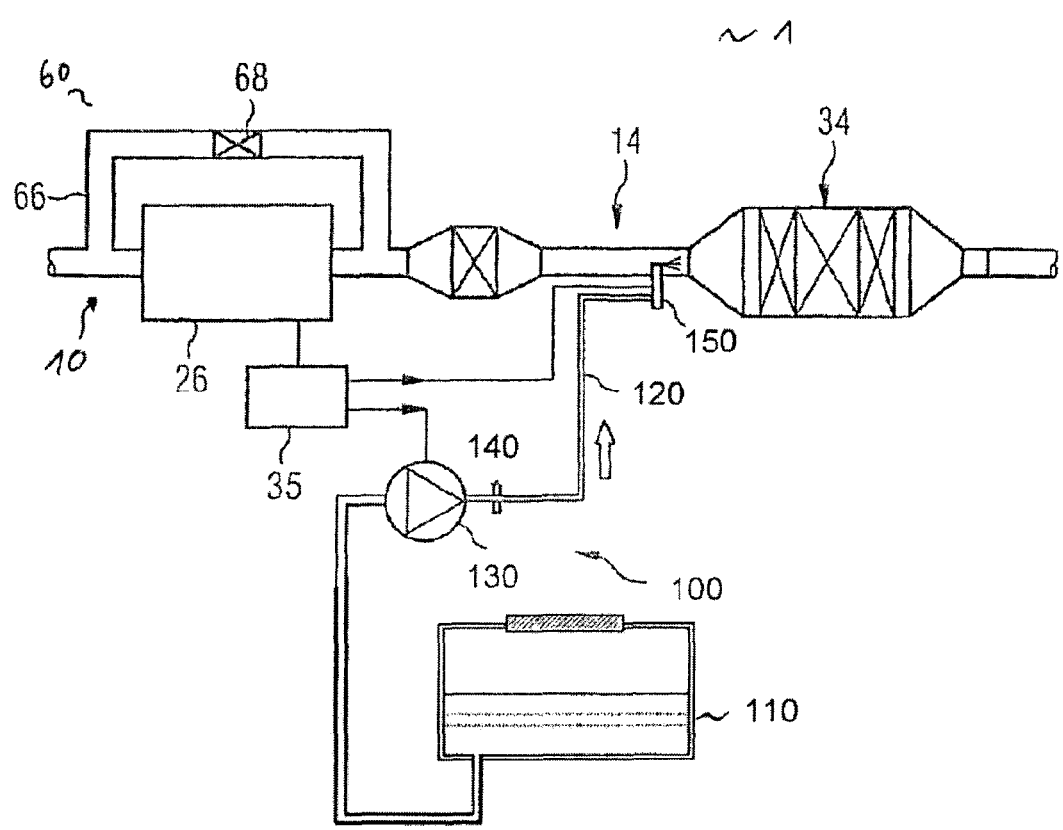
FIG. 1 is an exhaust gas aftertreatment system of an internal combustion engine.

FIG. 1 shows an exhaust gas aftertreatment system 1 having an intake section 10, a combustion chamber 26, an exhaust section 14, an exhaust return 60 and a reducing agent feed system 100.

The exhaust return 60 has an exhaust gas recirculation line 66. The exhaust gas recirculation line 66 branches off from the exhaust section 14 downstream of the combustion chamber 26 and opens into the intake section 10 upstream of the combustion chamber 26. Arranged in the exhaust gas recirculation line 66 is an exhaust gas recirculation valve 68, by which a quantity of exhaust gas fed back can be controlled. By the exhaust gas recirculation line 66, exhaust gas can be fed back into the combustion chamber 26 of the internal combustion engine in order in this way to lower the oxygen content of the induced gas mixture intended for the combustion chamber 26 and thus lower nitrogen oxide emissions.

A catalytic converter 34 for selective catalytic reduction (SCR catalytic converter) is arranged in the exhaust section. An oxidation catalytic converter arranged downstream of the SCR catalytic converter 34 can oxidize NO emerging from the SCR catalytic converter 34 to give $NO_2$.

A reducing agent feed system 100 is preferably associated with the exhaust section 14. The reducing agent feed system 100 comprises a tank device 110 for holding the reducing agent. The reducing agent feed system 100 furthermore has various hydraulic units, such as a reducing agent pump 130, a pressure control valve 140 and a reducing agent injection valve 150. By the reducing agent pump 130, the reducing agent can be passed out of the tank device 110, via a reducing agent line 120 to the reducing agent injection valve 150. The reducing agent can then be metered into the exhaust section 14 through appropriate control of the reducing agent injection valve 150, it being possible for the direction of injection to be either in the direction of the exhaust gas stream or in the direction counter to the exhaust gas stream. Pumping the reducing agent out of the tank device 110 toward the reducing agent injection valve 150 contributes to advantageous metering of the reducing agent.

A control device 35 can be designed and arranged to control metering of the reducing agent in accordance with measured variables detected in the combustion chamber and/or in the tank device 110.

To allow as accurate as possible metering of the reducing agent, one or more parameters, e.g. the reducing agent concentration, of the reducing agent can be detected and/or determined. There may be a change in the reducing agent concentration due to decomposition reactions and/or concentration resulting from evaporation, for example. One or more sensor elements can be arranged in the tank device 110 in order to detect the respective parameters. Since the respective parameters may exhibit a temperature dependence, for example, another advantageous possibility is to detect the temperature of the reducing agent.

Figure 2:
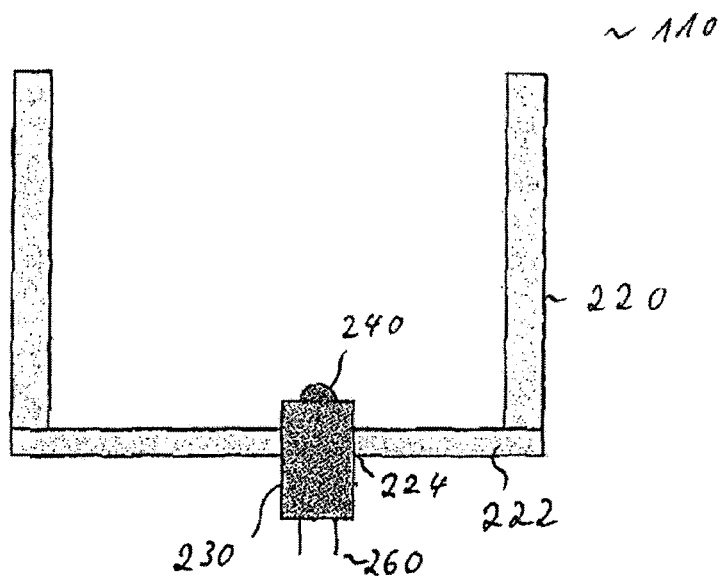
FIG. 2 is a first embodiment of a tank device.

FIG. 2 shows a first embodiment of the tank device. The tank device 110 comprises a container 220 for storing the reducing agent, having a container wall 222, which comprises a first plastic, at least in a first contact area. The tank device 110 furthermore comprises a support element 230, which is arranged in an aperture 224 in the container wall 222 and has an overmolding comprising a second plastic, at least in a second contact area, which is coupled to the first contact area of the container wall 222 in a substantially liquid-tight manner in the second contact area. The first and the second plastic can comprise substantially the same chemical components. The first plastic and the second plastic can comprise polyethylene and, in particular, can be composed of polyethylene, for example.

The aperture 224 in which the support element 230 is arranged is arranged in spatial proximity to a discharge opening of the tank device 110, for example. The aperture 224 is preferably arranged in a bottom wall of the container 220.

The support element 230 comprises a sensor device 240, e.g. a sensor device having a temperature sensor element. The temperature sensor element can have an electrical resistor with a negative temperature coefficient. The support element 230 has electrical connections 260 at a second end pointing outward out of the container 220, which connections can be coupled electrically in a predetermined manner to the sensor device 240.

Figure 3:
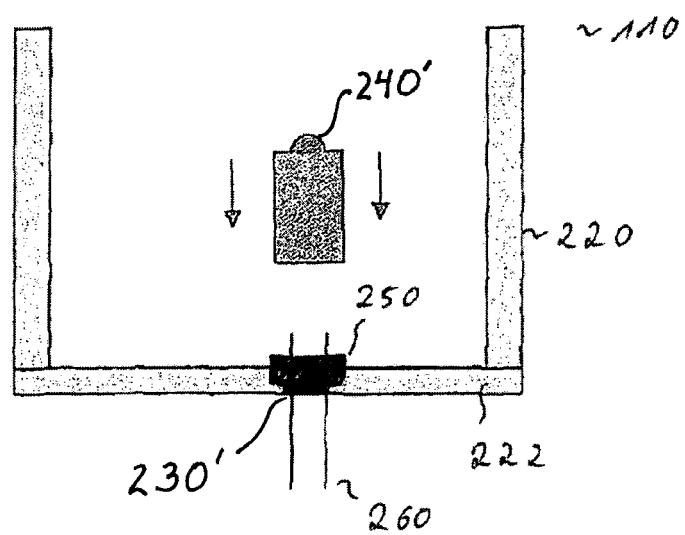
FIG. 3 is a second embodiment of the tank device.

FIG. 3 shows a second embodiment of the tank device. In comparison with the embodiment shown in FIG. 2, the support element 230' in this case has a locking device 250 for the mechanical and/or electrical coupling of a subassembly 240'. The subassembly can comprise an ultrasonic sensor, for example.

The tank device 110 can have one or more such support elements. The support elements 230, 230' can be of different designs. The respective support element 230, 230' can comprise a sensor device 240 or a locking device 250 or a sensor device 240' and a locking device 250, for example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A tank device for storing a liquid medium that reduces pollutant levels in exhaust gases, comprising:
   a container configured to store the liquid medium, the container having a container wall that comprises a first plastic at least in a first contact area; and
   a support element arranged in an aperture in the container wall and having a coating comprising a second plastic at least in a second contact area, wherein the second plastic of the second contact area is coupled to the first plastic of the first contact area of the container wall in a liquid-tight manner.

2. The tank device as claimed in claim 1, wherein the first plastic and the second plastic comprise polyethylene.

3. The tank device as claimed in claim 1, wherein the support element comprises a sensor device.

4. The tank device as claimed in claim 3, wherein the sensor device comprises a temperature sensor element.

5. The tank device as claimed in claim 4, wherein the temperature sensor element has an electrical resistor with a negative temperature coefficient.

6. The tank device as claimed in claim 4, wherein the temperature sensor element is arranged at an end of the support element that points into the container.

7. The tank device as claimed in claim 1, wherein the aperture is arranged in spatial proximity to a discharge opening of the tank device.

8. The tank device as claimed in claim 1, wherein the support element comprises a locking device for at least one of mechanical coupling and electrical coupling of at least one further subassembly.

9. The tank device as claimed in claim 8, wherein the support element has electrical connections at a second end pointing outward out of the container, that are coupled electrically to at least one of a sensor device and the locking device.

10. The tank device as claimed in claim 8, wherein the at least one further subassembly comprises an ultrasonic sensor.

* * * * *